E. F. STENEMAN.
NEST.
APPLICATION FILED JUNE 27, 1921.

1,400,576.

Patented Dec. 20, 1921.

Emil F. Steneman
INVENTOR.

BY Nathan Comstock
ATTORNEY.

UNITED STATES PATENT OFFICE.

EMIL F. STENEMAN, OF ARCADIA, WISCONSIN.

NEST.

1,400,576. Specification of Letters Patent. Patented Dec. 20, 1921.

Application filed June 27, 1921. Serial No. 480,623.

*To all whom it may concern:*

Be it known that I, EMIL F. STENEMAN, a citizen of the United States, residing at Arcadia, in the county of Trempealeau and State of Wisconsin, have invented a new and useful Improvement in Nests, of which the following is a specification.

My invention relates to nests such as are used in the care of fowls and has for its object the provision of a darkened, ventilated, conveniently supported, easily accessible, vermin proof nest of novel construction and general arrangement of parts, which may be readily cleaned or disinfected, adapted to trapping and setting, and easily and cheaply manufactured.

I attain these and other objects and advantages by the structure illustrated in the accompanying drawing, in which—

Figure 1:
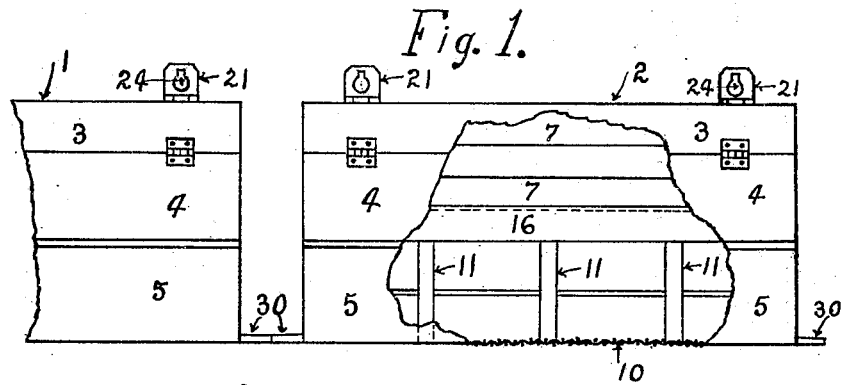
Figure 2:
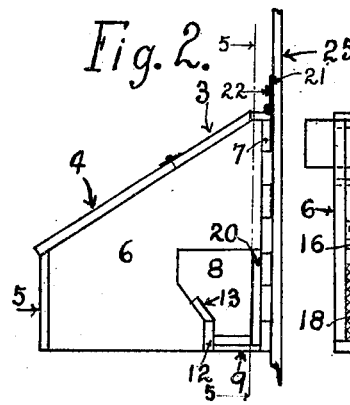
Figure 3:
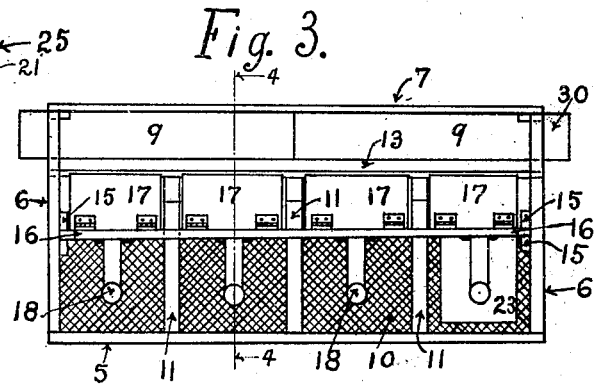
Figures 4, 5:
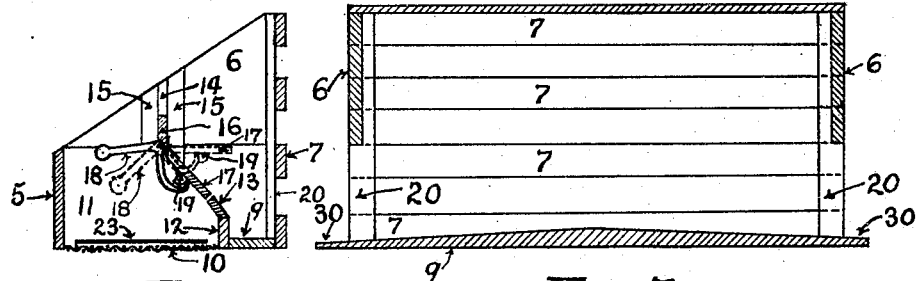

Figure 1, is an elevation showing the relative arrangement of the nests, a portion of one being broken away to show the interior, Fig. 2, is an end elevation, Fig. 3, is a plan of a nest with the top removed, Fig. 4, is a section on the line 4—4 of Fig. 3, looking in the direction of the arrows, and Fig. 5, is a section on the line 5—5 of Fig. 2, looking in the direction of the arrows.

Similar numerals refer to similar parts throughout the several views.

In the preferred form of my invention I provide nests adapted to be arranged adjacent each other as shown at 1 and 2, Fig. 1. These nests are formed with a top 3 having a portion thereof inclined toward the rear and provided with a hinged part 4. A side 5 is secured to the ends 6 and by them to the top 3. The front of the nest is formed of slats or bars 7 secured to the ends 6 and uprights 20. The lower front portions of the ends 6 are cut away to form entrance apertures 8 having an upper portion of sufficient width to admit the body of the fowl and a narrow run way thus providing the smallest possible opening. The bottom of the nest is formed by the narrow running board 9 for the run way and a mesh fabric 10 for the nesting portion of the structure. Partitions 11 divide the nesting portion into suitable nesting compartments, of which there may be any appropriate number though I have found four as shown a convenient and desirable number for each nest. Secured to the ends 6 and partitions 11 is a connecting member 12 and a retaining member 13 which form the front walls of the nesting compartments and hold the nesting material therein. The running board 9 is secured to and held in place by the lower bar 7 and the connecting member 12, and is sloped from the middle to each of the projecting ends 30, as shown in Fig. 5.

Slideways 14 are formed by cleats 15 secured to the ends 6. A bar 16 is adapted to slidably enter these ways and rest upon and be supported by the tops of the partitions 11. Hinged to the lower front corner of the bar 16 are doors 17 spaced so that they will act as closures for the nesting compartments when the bar 16 is slid into position. At the opposite lower corner of the bar 16, weighted latches 18 are pivoted so as to engage projections 19 upon the doors 17.

Hinges 21 are secured to the nest and provided with key hole slots 24 adapted to pass over and removably engage suitable fasteners 22 placed in the wall of the coop 25.

Pieces of heavy paper or other imperforate material 23 adapted to cover the mesh fabric bottom of a nest compartment, with the exception of a small space around its edges are provided for that purpose when the nest is occupied by setting fowls.

The nest is coated and impregnated by dipping in a suitable disinfecting a detergent fluid which will form a dry smooth surface. The fluid used is preferably one containing a large percentage of creosote.

In use the nests are preferably supported, upon the wall of a coop a suitable distance from the floor with the fronts of the nests against the wall, by means of the hinges 21 and fasteners 22, and with the projecting ends 30 of the running boards abutting and forming a platform from which a fowl may enter a nest in either direction. The projections of the running board are of proper length so that when they abut the space between the ends of the nests will be just sufficient to permit a single fowl to occupy the platform at one time. The spacing of the nests together with the small entrance opening and narrow runway serves to prevent crowding and consequent injury to the fowls.

The placing of the fronts of the nests against the wall of the coop, the spacing of the nests, the reducing of the area of the entrance opening and placing it near the front of the nest, and the connecting and retaining members, all assist in producing a darkened nest chamber which is highly desirable in structures of this character.

Should one desire to clean the nest it may be swung upward on the hinges 21 and the interior contents shaken through the bars or slats 7; while the nest is held in this position the floor beneath it may also be readily cleaned. The hinges 21 also permit the nest to adapt itself to an inclined or irregular wall surface.

If it should become necessary to disinfect the nest it may be readily done by raising it and slipping the hinges off from the fasteners 22, and again dipping it.

The mesh bottoms of the nest chambers together with the slatted front and entrance openings provide a free and thorough ventilation for the nest, which has been found excessive in the case of setting fowls, and has caused a chilling of the eggs. This difficulty has been overcome by providing the members 23 to be used under such conditions to protect the eggs from any direct draft, but permit a circulation of air around the sides of the nest.

In case it is desirable to use the nest for trapping the fowl the bar 16 with its doors 17, and latches 18 is placed in the ways 14 and allowed to come to rest upon the partitions 11; the doors are then raised to the positions shown in dotted lines in Fig. 4, and the weighted latches 18 caused to engage the rear sides of the projections 19, and hold the doors open; if a fowl then enters a nest its body will strike a latch 18 releasing a door and allowing it to fall, and the end of the latch will ride over the projection 19 and engage its front side, and hold the door closed, thus confining the fowl.

The hinged part 4 of the top 3 provides access to the interior of the nest without disturbing the fowl within it. The inclination of the runway toward each end assists in keeping the nest clean and facilitates cleaning.

While I have shown and described a specific nest structure for accomplishing the desired objects, my invention contemplates broadly the use of means operating in the same manner to produce the results desired, and is to be understood as limited only by the state of the art.

I claim:

1. The combination in a nest, of end members having their top edges inclined toward the rear and provided with entrance apertures at their lower front corners, uprights secured to the end members at the front edges thereof, bars secured to the end members and uprights to form the front side of the nest, a side member secured to the rear edges of the end members, a top member secured to the end members and provided with a hinged part for access to the nesting chamber, partitions secured to the side member, a connecting member secured to the ends at the bottom rear edge of the entrance openings and to the front ends of the partitions, a retaining member secured to the end members and front ends of the partitions above and abutting the connecting member, a running board at the bottom of the entrance openings secured to the lower bar and connecting members, said board being inclined from its center toward both ends and extending beyond the end members to form entrance platforms, a bottom of mesh fabric for the nest, and hinged members adapted to engage fasteners in the wall for supporting the nest with its front against the wall of a coop.

2. The combination in a nest, of end members having a portion of their top edges inclined toward the rear and provided with entrance apertures at their lower front corners, uprights secured to the end members at the front edges thereof, bars secured to the end members and uprights to form the front side of the nest, a side member secured to the rear edges of the end members, a top member secured to the end members and provided with a hinged part for access to the nesting chambers, partitions secured to the side member, a connecting member secured to the ends at the bottom rear edge of the entrance aperture and to the front ends of the partitions, a retaining member secured to the end members and front ends of the partitions and abutting the connecting member, a running board at the bottom of the entrance openings secured to the lower bar and the connecting member the board being inclined from its center toward both ends and extending beyond the end members to form entrance platforms, a bottom of mesh fabric for the nest, cleats secured to the end members to form slideways, a bar member adapted to slide in the slideways and rest upon the tops of the partitions, doors for closing the fronts of the nesting spaces formed by the partitions hinged to the lower front corner of the bar member, projecting members on the inner sides of the door members, weighted latch members pivoted to the opposite lower corner of the bar member adapted to be engaged with the rear sides of the projecting members and hold the doors open and when tripped to ride over the projecting members and engage their other sides and hold the doors in closed position, hinged members adapted to engage fasteners in the wall for supporting the nest with its front against the wall of a coop, and an impregnating disinfecting coating for the nest having a dry smooth surface.

3. In a nest the combination, of a slatted front, a runway extending along the front and having entrance apertures at the ends of the nest, nesting compartments adapted to be entered from the runway, a mesh fabric bottom for the nesting compartments, a top having a hinged portion providing access to the nesting compartments, and hinge members adapted to support the nest.

EMIL F. STENEMAN.